(12) United States Patent
Kaminaga et al.

(10) Patent No.: US 7,874,013 B2
(45) Date of Patent: Jan. 18, 2011

(54) SECURE AND GRANULAR INDEX FOR INFORMATION RETRIEVAL

(75) Inventors: Garrett Kaminaga, Redwood Shores, CA (US); Paul Dixon, Redwood City, CA (US)

(73) Assignee: Sawteeth, Inc., San Mateo, CA (US)

( * ) Notice: Subject to any disclaimer, the term of this patent is extended or adjusted under 35 U.S.C. 154(b) by 480 days.

(21) Appl. No.: 11/786,282

(22) Filed: Apr. 10, 2007

(65) Prior Publication Data

US 2007/0255698 A1 Nov. 1, 2007

Related U.S. Application Data

(60) Provisional application No. 60/791,077, filed on Apr. 10, 2006.

(51) Int. Cl.
*G06F 7/04* (2006.01)
(52) U.S. Cl. .......................................... 726/28; 713/150
(58) Field of Classification Search ................... 726/28; 713/150
See application file for complete search history.

(56) References Cited

U.S. PATENT DOCUMENTS

2005/0004924 A1* 1/2005 Baldwin ...................... 707/100

OTHER PUBLICATIONS

E. Shmueli, R. Waisenberg, Y. Elovici, and E. Gudes. "Designing secure indexes for encrypted databases", In S. Jajodia and D. Wijesekera, editors, Proceedings of Data and Applications Security, 19th Annual IFIP WG 11.3 Working Conference, vol. 3654 of Lecture Notes in Computer Science, pp. 54-68. Springer-Verlag, 2005.*
International Preliminary Report on Patentability, Application No. PCT/US2007/008786, dated Feb. 24, 2009.
http://www.oracle.com/technology/products/text/x/tech_overviews/imt_815.html#Section_groups.
Ohtaki, Y., "Constructing a searchable encrypted log using encrypted inverted indexes," International Conference on Cyberworlds, 2005, Nov. 23-25, 2005, relevant parts: pp. 1, 3-5.
B. Waters, D. Balfanz, G. Durfee, and D. Smetters, "Building an encrypted and searchable audit log". In Proceedings of the 11th Network and Distributed System Security (NDSS) Symposium, Internet Society (ISOC), Feb 2004. Relevant Part: p. 3.
B. Schneier and J. Kelsey, "Secure audit logs to support computer forensics", ACM Transactions on Information and System Security (TISSEC), 2(2):159-176, 1999, Relevant Part: p. 164.
International Search Report and Written Opinion for PCT/US07/0786 mailed Aug. 18, 2008, 12 pages.

* cited by examiner

*Primary Examiner*—Kimyen Vu
*Assistant Examiner*—Yogesh Paliwal
(74) *Attorney, Agent, or Firm*—Blakely Sokoloff Taylor & Zafman, LLP

(57) ABSTRACT

A method and apparatus for a secure and granular index for information is described herein. According to one embodiment of the invention a computer-implemented method is described including evaluating a user query against a set of documents having sub-document level security control, determining a security access for said user, and providing a result for the user query based on the security access for the user and the sub-document level security control.

20 Claims, 6 Drawing Sheets

Elizabeth David likes Mexican food.

FIG. 1A (Prior Art)

David eats Peruvian food.

FIG. 1B (Prior Art)

| TOKEN | POSTING LIST |
|---|---|
| david | <1,2>, <2,1> |
| eats | <2,2> |
| elizabeth | <1,1> |
| food | <1,5>, <2,4> |
| likes | <1,3> |
| mexican | <1,4> |
| peruvian | <2,3> |

FIG. 1C (Prior Art)

Elizabeth David likes <high> Mexican </high> food.

FIG. 2

| GROUP | TOKEN | POSTING LIST |
|---|---|---|
| low | david | ???? |
| low | elizabeth | ???? |
| low | food | ???? |
| high | mexican | &&&& |
| low | like | ???? |

---> Encrypted with a different key

FIG. 3

| HASH | GROUP | TOKEN | POSTING LIST |
|---|---|---|---|
| #### | low | ????? | ???? |
| #### | low | ????? | ???? |
| #### | low | ????? | ???? |
| #### | high | &&&&& | &&&& |
| #### | low | ????? | ???? |

FIG. 4

SECURE AND GRANULAR INDEX FOR INFORMATION RETRIEVAL

CROSS-REFERENCE TO RELATED APPLICATIONS

This application claims the benefit of U.S. provisional application titled "Secure and Granular Index for Information Retrieval," having application No. 60/791,077 and having a filing date of Apr. 10, 2006, herein incorporated by reference.

BACKGROUND OF THE INVENTION

1. Field of the Invention

The present invention relates to the field of information retrieval and more specifically to an apparatus for a secure and granular information retrieval index and its method of operation.

2. Discussion of Related Art

A typical full-text index inverts the words in a document to allow efficient lookup of terms from a query. Inverts refers to the organization of word locations under the word rather than the ordinary sequential order of words that occurs in prose. This is analogous to a back-of-book index in an indexed paper book (i.e.; the common human-built index that occurs at the end of most non-fiction conventional physical books, such as would be found on a bookshelf). This full-text index is typically referred to as an inverted index.

An inverted index consists of the token (individual terms in a document), along with their posting lists (word offsets and the document in which they occur). Example document 1 shown in FIG. 1A contains tokens, "elizabeth" at offset 1, "david" at offset 2, etc.

To index both of the documents represented in FIGS. 1A and 1B, the inverted index would be as shown in FIG. 1C. The posting list in the FIG. 1C example is made up of tuples (lists of pairs of related numbers) containing the document number (an identifier that is ascending to handle sequential read) and an offset within that document. Posting lists are typically compressed to save space, and are processed sequentially.

This data structure is used during a full-text query in order to retrieve the documents and positions within documents that satisfy the query. For example, the query "food" would look up token "food", retrieve the posting list, and return document 1, offset 5, and document 2, offset 4. The position information found in a posting list may be used to jump to an offset within a document, or to perform extended boolean query functions, such as finding phrases, or words within a certain proximity to one-another.

To perform a phrase query such as "elizabeth david", the query process looks up tokens "elizabeth" (in document 1, offset 1) and "david" (in document 1, offset 2, and document 2, offset 1). Since both words together only occur in document 1, the query process looks for adjacent occurrences; "david" immediately following "elizabeth." Since "elizabeth" occurs at offset 1 and "david" occurs at offset 2, this condition is satisfied, and a phrase match is returned.

Full-text indexes have a number of security issues. A fundamental issue is that the majority of the contents of the documents in the indexed collection can be recreated from the information in the index alone. To do this, the inverted index is itself inverted. Since token values and positions are all indexed, there is little loss of information. All that is necessary is to understand the structure of the token array and posting list, which is typically a compression of a simple binary encoding.

Reading top-down through the example inverted index in FIG. 1C, after the first row, one constructs: doc 1:"_____ david" and doc 2: "david". After the second index row constructs: doc 1:"_____ david" and doc 2: "david eats". After the third row constructs: doc 1: "elizabeth david" and doc 2: "david eats" and so on to complete the document collection, minus minor formatting information.

SUMMARY

A method and apparatus for a secure and granular index for information is described herein. According to one embodiment of the invention a computer-implemented method is described including evaluating a user query against a set of documents having sub-document level security control, determining a security access for said user, and providing a result for the user query based on the security access for the user and the sub-document level security control.

BRIEF DESCRIPTION OF THE DRAWINGS

FIG. 1A illustrates an example of a document used by an information retrieval system.

FIG. 1B illustrates an example of a document as used by an information retrieval system.

FIG. 1C illustrates an example of an inverted index as used by the prior art.

FIG. 2 illustrates a document with security markup according to one embodiment of the invention.

FIG. 3 illustrates an inverted index created using posting lists encrypted with different keys according to one embodiment of the invention.

FIG. 4 illustrates an inverted index created when using token hashing according to one embodiment of the invention.

DETAILED DESCRIPTION

Figure 5:
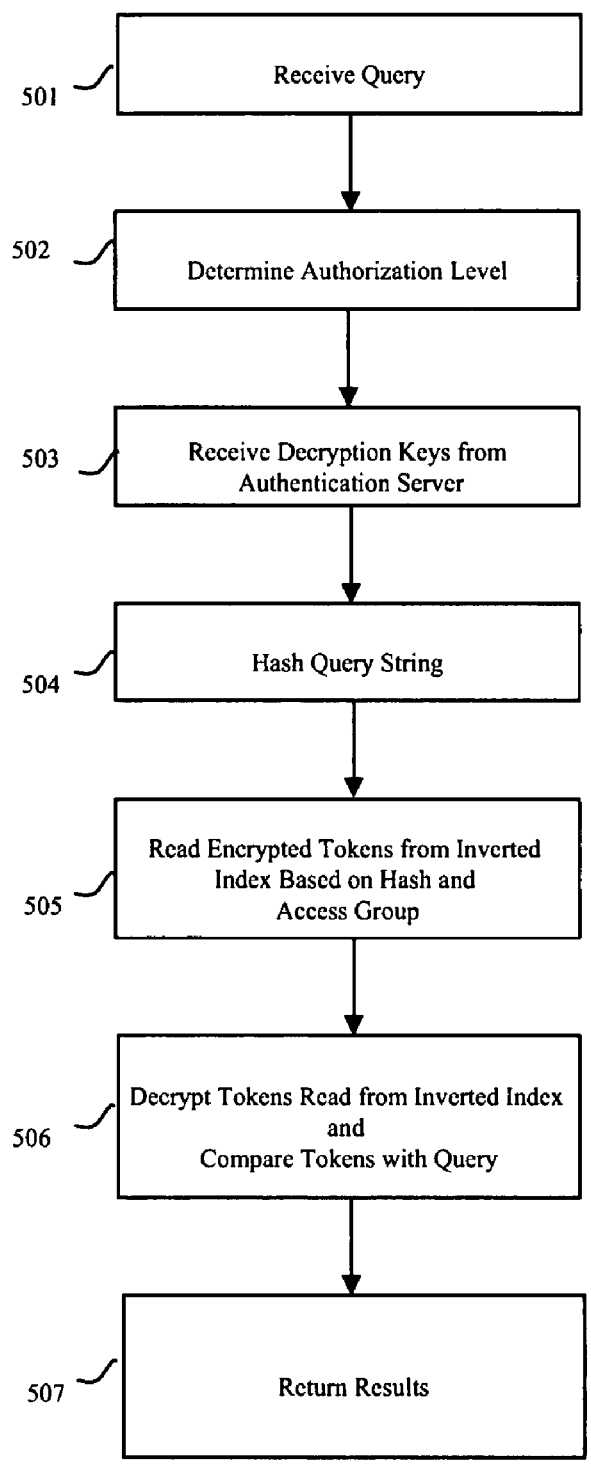
FIG. 5 illustrates a flow diagram of a query process according to one embodiment of the invention.

In the following description numerous specific details are set forth in order to provide an understanding of the claims. One of ordinary skill in the art will appreciate that these specific details are not necessary in order to practice the disclosure. In other instances, well-known techniques have not been set forth in particular detail in order to not unnecessarily obscure the present invention.

Embodiments of the information retrieval (IR) index support the indexing and retrieval of document fragments. Therefore, sections of documents, as opposed to monolithic records, may be marked with personal, group, role, or labeled access controls to control who may access certain information within a document. For an embodiment, the access controls defined at a level of granularity below the document itself restrict access of portions of a document that is visible to search operations.

This granular security control allows both unprecedented protection and highly-controlled sharing of textual information. Moreover, the granular security control provides databases that have been separated for security purposes to be integrated and yet provide the same level of security. Granularity permits organizations to grant access to the maximum amount of information possible, while confidently protecting personal, classified, or sensitive information. Therefore, portions of the database may be selectively shared. For example, a medical document in a database may include sections for patient billing information, patient medical history, and family medical records for the patient The granular security control provides a way to secure the sections of documents at different access levels. Thus, individuals needing access to billing records could be provided access to a patient's billing records without having access to a patient's medical history or family medical records. Moreover, secure indexes prevent the inadvertent or malicious distribution of sensitive data, as well as securing data against application logic errors.

Embodiments of indexes of the present invention are relatively secure. "Secure" means that unauthorized processes or users cannot access index data. Index data that resides on a persistent storage device, such as a disk drive, is encrypted so that it is not observable by any process that does not hold the key to the data indexed at that security level within a document. Algorithms used for encryption of index data may include RSA, Data Encryption Standard (DES), Blowfish, International Data Encryption Algorithm (IDEA), RC4, proprietary algorithms, or any other encryption techniques known in the art. Because embodiments of the present invention create indexes that include security granularity at the token level, an index structure that is created is fast to search yet still secure.

In certain embodiments, encryption keys are obtained from an authentication server, system, or device, external to an embodiment of an index and a query system as described here. For such an embodiment, an authentication server would provide encryption keys to a search engine of an index system based on an access level of a user of the index system.

The inverted index (tokens, posting list, section information) and all associated index data is built or created in memory, such as computer random access memory (RAM), and encrypted before being written to a persistent storage device. Persistent storage devices may include a disk drive, tape, read-only memory, or other machine-readable media. For example, machine-readable media includes machine storage media (e.g., magnetic disks; optical disks; read only memory; flash memory devices) and machine communication media (e.g., electrical, optical, acoustical or other form of propagated signals—such as carrier waves, infrared signals, digital signals, etc.). One embodiment of such an in-memory inverted index data structure is a hash table, where the hash is constructed on the text token values. The hash may be used as a way for an information retrieval system to compare a token to a search term without having to decrypt each token to perform a search. Therefore, the use of a hash value in certain embodiments provides a more time efficient way to search an inverted index because the relevant tokens and posting list information are decrypted and not the entire index. For each hash value, posting list information is attached with a linked list. In one embodiment of this invention, said memory is accessible by a single program process, as is typically enforced by the computer operating system. This in-memory data structure contains the same information as the on-disk inverted index. Once the in-memory list is constructed, it can thus be written to disk via a transformation. For an embodiment, transformation includes encryption of the information. Encryption of this index information would typically be a conversion process taking place after the in-memory index is populated.

Recreating the order of words in the original document is thus impossible based on data accessible without the encryption key. To recreate the document collection, one needs both the token (word) and position. With embodiments of the present invention, since both are encrypted, neither is accessible to external users or processes. This process is reversed when reading index data at query time, as is discussed below in the query processing section.

Granularity Aspect of Embodiments of Indexes

Granular security refers to the multiple levels of security that may co-exist within a single document for purposes of retrieval. In other words, a document author, editor, or automatic system can mark up documents with security information such that, for the purposes of search (and other document operations) that a document would appear to be composed of only those parts that the searching process is permitted to see. Such granularity provides sub-document level security control. Inverted indexes according to some embodiments of the present invention support access control of a document as a whole or parts of a document down to the level of an individual word. This allows access control whereby searches only act on textual content visible at the authenticated access level. In an embodiment, the granularity is accomplished by separating posting list information based on access control of the location at which the source data in the document collection is located.

For example, a posting list of an inverted index may include access control information of each individual token. Therefore, a search initiated by a user or a process would only have access to the tokens in the inverted index that the user has proper authority to access. One such embodiment creates a plurality of inverted indexes each storing tokens that belong to one level of an access control group. Thus, only the inverted indexes a query is authorized to access are used to form results for that query. For an embodiment, individual information in a posting list belongs to a designated security level. The security level of the information determines the encryption key used to encrypt the information in the posting list. Therefore, a user or accessing process needs to have available at read-time the appropriate key for each and every security level of information it has authorization to access.

Another embodiment includes the use of a post-filtering operation to provide granular access control. In such an embodiment, a query is evaluated using the full inverted index without regard to the access level of the query. Once the query is evaluated using the full inverted index, documents matching the query are evaluated based on the sub-document access control. This post-filtering step is used to only return the portions of the documents that the query is authorized to access.

To provide security access level information to an embodiment of an IR system the documents may include information within the document, alongside the document, or outside the document. Such information expresses directly or indirectly the security level of portions of a document. As discussed above, the portion of a document may be as small as the individual words of a document. However a document is marked up, that information is conveyed to the indexing process to ensure a user only has access to the information that the user is authorized to access. Embodiments of the present invention include using Extensible Markup Language (XML), Standard Generalized Markup Language (SGML) sections, Network News Transfer Protocol (NNTP) header, section notations, lists, lexicons, regular expressions, local grammars, top-down grammars, heuristics, a function based on a word list or local grammar, or any combination thereof may be used to convey the security access level of portions of a document to an embodiment of an IR system.

FIG. 2 illustrates an embodiment of a document with security markup. In this example, the word "mexican" has been marked as high security and the rest of the document is assumed to be low security. As illustrated in FIG. 2, the word "Mexican" is surrounded by a start tag (<high>) and an end tag (<high>) designating the word as a high-level security word. FIG. 3 illustrates an inverted index of the document illustrated in FIG. 2. The inverted index of FIG. 3 includes a group column, a token column, and a posting list column. The group column indicates the security access level of the token in that row. For example, "david" belongs to the "low" security access group. FIG. 3 also illustrates the information in the posting list column as an encrypted posting list. Index posting list information is encrypted using a key associated with the security group of the token or source text fragment. Posting list information in the "low" key group is illustrated with "?" symbols, and information in the "high" key is illustrated with "&" symbols. Thus, the tokens and posting list are no longer deducible, since it is no longer readable without the proper key.

Token-Index Security Aspect to Embodiments of Indexes

It is also possible to deduce some information about the document collection from the token list alone; for example, the presence of the word "mexican" in the FIG. 3 example. The presence of this word can be deduced by simply examining the token text data structure, where it is available to see as clear-text or as a compressed version of text. Embodiments of indexes according to the present invention solve this problem by encrypting token values and indexing them via a hash under the appropriate security group. The hash is used to provide a many-valued key so as to retain the efficiency of the inverted indexed token lookup. The hash has variability closer to the token values in a typical natural language corpus, as opposed to a relatively limited number of security groups. A hash is one of a set of well-known techniques for efficiently assigning keys to bucket locations; that is, transforming the input in as balanced a manner as possible to a set of outputs. A hash may be created by any algorithm known in the art including but not limited to HAVAL, Message Digest Algorithm (MD) 2, MD4, MD5, PANAMA, RACE Integrity Primitives Evaluation Message Digest (RIPEMD), RIPEMD-128/256, RIPEMD-160/320, Secure Hash Algorithm (SHA)-0, SHA-1, SHA-256/224, SHA-512/384, Tiger(2)-192/160/128, and Very Efficient Substitution Transposition (VEST)-4/8, VEST-16/32.

To continue with the above example, with token hashing, the index now appears as shown in FIG. 4 and includes the hashed tokens (now represented by the "####" symbols.) The hash symbol reflects the fact that the original token can no longer be determined from the value in this column, as it is the result of a one-way transformation function on the input text token. Now it is no longer possible to determine specific vocabulary anywhere in the collection. For an embodiment, the same encryption key used to encrypt posting list information for a token may be used to create a hash for that token.

Query Processing with Granular Security Model Indexes

Query processing is essentially the reverse of the indexing process. As discussed above, a user or a process will perform a query. For an embodiment, an information retrieval system includes a search engine to evaluate the query against an inverted index. The information retrieval system also determines the security authorization level of the query. An authorization mechanism for certain embodiments of an information retrieval system may be external to the information retrieval system such as an authorization server. Other embodiments may include an authentication device internal to the information retrieval system. For embodiments of an information retrieval system, the authorization mechanism provides keys for decrypting all or portions of an inverted index.

Once the authorization level of the query is determined, the search engine provides results for the query based on the authorization level of the query. As discussed above, some embodiments may use a post-filtering operation where the query is compared against all the tokens in the inverted index and returns all matching documents regardless of the security authorization as a preliminary result. Before this preliminary result is accessible by the user or the process that initiated the query, the search engine evaluates the preliminary result with regard to the authorization level of the query and returns only the results for the level the query is authorized to access.

Alternatively, an embodiment of an information retrieval system uses an inverted index that contains access control information for each token in the inverted index. For example, a posting list may include the access control information as well as information on location of a token in the documents. This access control information is used to create a modified inverted index that excludes tokens that the query is not authorized to access. The modified inverted index is then used to return a list of results based on the query for the authorization level of the query.

To illustrate the impact of granular security query according to an embodiment of an information retrieval system, examples follow that illustrate query scenarios with various degrees of security and overlap. In all of these cases, decryption keys are obtained from an authentication server, system, or device, as discussed above. FIG. 5 illustrates an embodiment of a query process. The flow begins at block 501 where the information retrieval system receives a query. For example, a query from a user authenticated and authorized as part of the "low" access group, and for the term "Mexican." The inverted index used for the FIG. 5 in this example is that of FIG. 4 where the posting list and the tokens have been encrypted. Furthermore, the encrypted tokens in the FIG. 4 inverted index are represented by a hash.

Block 501 illustrates an embodiment of an information retrieval system receiving a query for the word "Mexican." The authorization level of the query is determined at block 502. Based on the authorization level of the query, a set of encryption decryption keys are sent from an authentication server and received by the information retrieval system at block 503. As discussed above, the decryption keys are used for an embodiment to decrypt the portions of the inverted index that the query is authorized to access. Because the user initiating the query in this example is authorized as part of the "low" access group, the decryption keys for only the "low" access group are delivered.

At block 504, the search word "Mexican" is hashed to provide a hash value to compare with the hashes of the encrypted tokens as illustrated in FIG. 4. The tokens that have a hash value equal that of the word "Mexican" and the tokens belonging to the "low" access group are read from the inverted index of FIG. 4, as illustrated in block 505. The tokens read from the inverted index are then decrypted and compared with the query "Mexican" at block 506. At block 507 the results are returned to the user. For this example, there is no match for the word "Mexican" in the "low" access group. Therefore, the user receives the result of no matching records.

Another example includes a process initiating a query where the process has been authenticated and authorized as part of the "high" access group. As above, the input for the query is the term "Mexican." Because the query is authorized as belonging to the "high" access group, encryption keys corresponding to the "high" access group are retrieved by the information retrieval system for accessing the inverted index. The query term "Mexican" is hashed for comparing with the hash values of the inverted index. The hashes from the inverted index that match the hash for the term "Mexican" and the tokens that belong to the "high" access group are read from the inverted index. At this point, the tokens are read, decrypted, and compared with the search term "Mexican." In this example a match is found for the term "Mexican" because the query is authorized to access the "high" access group. Therefore, the posting list information for this match is read from the inverted index and is decrypted using the "high" key. This result of the documents that include the term "Mexican" are then presented to the user.

Another example includes a scenario where the query string is "Mexican food," which includes a term that is part of the "high" security group and a term that is part of the "low" security group. Furthermore, the query is authorized for access to the "low" access group. As discussed above, encryption keys that correspond to the "low" security group are received from an authentication server. The information retrieval system then searches the inverted index for the term "Mexican," similar to that discussed above. As above, no hits for the term "Mexican" are found because the query is authorized for access to the "low" access group and "Mexican" belongs to the "high" access group. In the same manner, the information retrieval system searches for the term "food." Since the query is authorized for the "low" access group and the term "food" belongs to the "low" access group, a match is made. Because the search for the term "Mexican" failed to return a match; a result of no match will be returned to the user. For embodiments of an information retrieval system, once a search fails to make a match for part of a query string the system may immediately return the results of no match to the user instead of performing the rest of the search. Alternatively, if the query is authorized to access the "high" access group, the match for "Mexican" and "food" would cause the posting list to be decrypted so the tokens could be evaluated to see if the terms are adjacent and are sequentially in the same order as the query string "Mexican food." Since the terms match the requirements of the search string, the section of the document that the match occurs would be returned to the user.

Another example according to the present invention includes a scenario where the query string is "David." In this example "David" is used in more than one place and is designated as part of the "high" security group in a first instance and as part of the "low" security group in a second instance. If the query is authorized for access to the "low" access group, the query would return a result including the second instance of "David" that is part of the "low" security group and not the first instance that is part of the "high" security group. Alternatively, if the query is authorized for access to the "high" security group, the query would return a result including both instances of the word "David."

Embodiments of the present information retrieval system features secure indexes and security granularity, which together solve the security problems of being able to recreate a document collection from its index, an excessively privileged administrator, and the need to classify documents in their entirety at the highest level of classification of individual parts of a document.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

We claim:

1. A computer-implemented method comprising:
    evaluating, by a computer system, a user query against a plurality of documents having sub-document level security control using a data structure, wherein said data structure includes a plurality of indexes, wherein each of said plurality of indexes belongs to a different one of a plurality of security access levels, wherein each of said plurality of indexes belonging to said plurality of security access levels is encrypted using a different encryption key, wherein different portions of the plurality of documents are assigned different ones of the plurality of security access levels, and wherein each of the portions is indexed by the one of the plurality of indexes belonging to the one of the plurality of security levels assigned to that portion, wherein said sub-document level security control restricts access to the portions of said plurality of documents through use of the different ones of the plurality of indexes belonging to the different ones of said plurality of security access levels;
    determining, by the computer system, a security access level for said user; and
    providing, by the computer system, a result for said user query based on said security access level for said user and said sub-document level security control.

2. The computer-implemented method of claim 1 wherein said data structure is an inverted index.

3. The computer-implemented method of claim 2 wherein said inverted index includes an encrypted token list and an encrypted posting list.

4. The computer-implemented method of claim 3 wherein said encrypted token list is indexed by a hash.

5. The computer-implemented method of claim 3 wherein said token list includes a value that represents a security access level for a token in said token list.

6. The computer-implemented method of claim 1 wherein determining said security access level for said user includes accessing an authorization server to provide one or more encryption decryption keys based on said security access level for said user.

7. The computer-implement method of claim 1, wherein each of said plurality of indexes store a posting list, wherein said posting list is based on a security access level for said index.

8. The method of claim 1, wherein the plurality of documents includes textual content, wherein the portions of the plurality of documents include an individual word for the plurality of documents.

9. An apparatus comprising:
    an index system to create an inverted index having index data to support access control of a plurality of documents, wherein said inverted index includes a plurality of indexes, wherein each of said plurality of indexes belongs to a different one of a plurality of security groups, wherein each of said plurality of indexes belonging to said plurality of security groups is encrypted using a different encryption key;
    a memory coupled with said index system wherein said index data is built;
    an authentication device coupled with said index system and with said memory to provide encryption keys to encrypt said index data within said memory to provide granular security, wherein said encryption keys are provided based on a security group of a user of said index system, wherein different portions of the plurality of documents are assigned different ones of the plurality of security groups, and wherein each of the portions is indexed by the one of the plurality of indexes belonging to the one of the plurality of security groups assigned to that portion, wherein said granular security restricts access to the portions of said plurality of documents through use of the different ones of the plurality of indexes belonging to the different ones of said plurality of security groups; and a disk coupled with said memory to store said encrypted and granular index data.

10. The apparatus of claim 9 wherein said index data includes a token and a posting list.

11. The apparatus of claim 10 wherein said posting list includes information based on access control.

12. The apparatus of claim 11 wherein said posting list information is encrypted by a key associated with a security group of said plurality of security groups.

13. The apparatus of claim 10 wherein said token is indexed via a hash.

14. A computer-implemented method comprising:

creating an inverted index in a memory, said inverted index providing sub-document level security control for a plurality of documents, wherein different portions of the plurality of documents are assigned different ones of the plurality of security access levels, and wherein each of the portions is indexed by the one of the plurality of indexes belonging to the one of the plurality of security levels assigned to that portion, wherein said sub-document level security control restricts access to the portions of said plurality of documents through use of the different ones of the plurality of indexes belonging to the different ones of said plurality of security access levels;

encrypting said inverted index, wherein said inverted index includes a plurality of indexes, wherein each of said plurality of indexes includes one of a plurality of authorization levels, and wherein each of said plurality of indexes belonging to said plurality of security groups is encrypted using a different encryption key;

querying said inverted index based on an authorization level of said query; and returning results based on said authorization level of said query and said sub-document level security control.

15. The computer-implemented method of claim 14 wherein querying said inverted index further includes accessing an authentication system to obtain one or more decryption keys for decrypting a portion of said inverted index based on said authorization level of said query.

16. The computer-implemented method of claim 14 wherein each of said plurality of indexes include a posting list, wherein said posting list is based on a authorization level for said index.

17. The computer-implemented method of claim 14 wherein said inverted index includes a plurality of tokens and a posting list.

18. The computer-implemented method of claim 17 wherein said posting list includes position information to identify location of one of said plurality of tokens and security information of one of said plurality of tokens.

19. The computer-implemented method of claim 17 wherein encrypting said inverted index includes encrypting said plurality of tokens and indexing each one of said plurality of tokens via a hash.

20. The computer-implemented method of claim 19 wherein each one of said plurality of tokens are grouped according to an authorization level for a corresponding index for said token.

* * * * *